United States Patent [19]

Venton-Walters

[11] 4,173,143
[45] Nov. 6, 1979

[54] FLUID FLOW MEASURING APPARATUS

[75] Inventor: Roy Venton-Walters, Steyning, England

[73] Assignee: Ricardo & Co., Engineers (1927) Limited, Shorham-by-Sea, England

[21] Appl. No.: 933,044

[22] Filed: Aug. 10, 1978

[30] Foreign Application Priority Data

Aug. 11, 1977 [GB] United Kingdom ............... 33782/77

[51] Int. Cl.² ............................................. G01F 1/32
[52] U.S. Cl. ................................................ 73/194 VS
[58] Field of Search ................................... 73/194 VS

[56] References Cited

U.S. PATENT DOCUMENTS 3,867,839  2/1975  Herzl ...................................... 73/194

FOREIGN PATENT DOCUMENTS 2531694  2/1976  Fed. Rep. of Germany ............. 73/194
48-20553  5/1973  Japan ....................................... 73/194
49-14156  5/1974  Japan ....................................... 73/194

Primary Examiner—Herbert Goldstein
Attorney, Agent, or Firm—Cushman, Darby & Cushman

[57] ABSTRACT

A fluid flow meter, for example for measuring the velocity of an air flow, comprises a flow duct having a transverse vortex-shedding bar, the ultrasonic or other detector means for sensing the shedding of Karman vortices from the bar as the fluid flow passes the bar, and for converting the alternating output signal of the detector means into a signal of square-wave form of operating a digital counter, and one or more additional cross-members extending across the flow duct downstream of the flow section where the vortex-sensing means operates, the additional cross-member extending transversely to the vortex-shedding bar and being of cylindrical or aerofoil cross-section, or of rectangular or other cross-section having a flat upstream face parallel to the bar. The provision of the additional cross-member is found to improve the regularity of the vortex-shedding from the bar and hence the accuracy of the meter reading.

14 Claims, 16 Drawing Figures

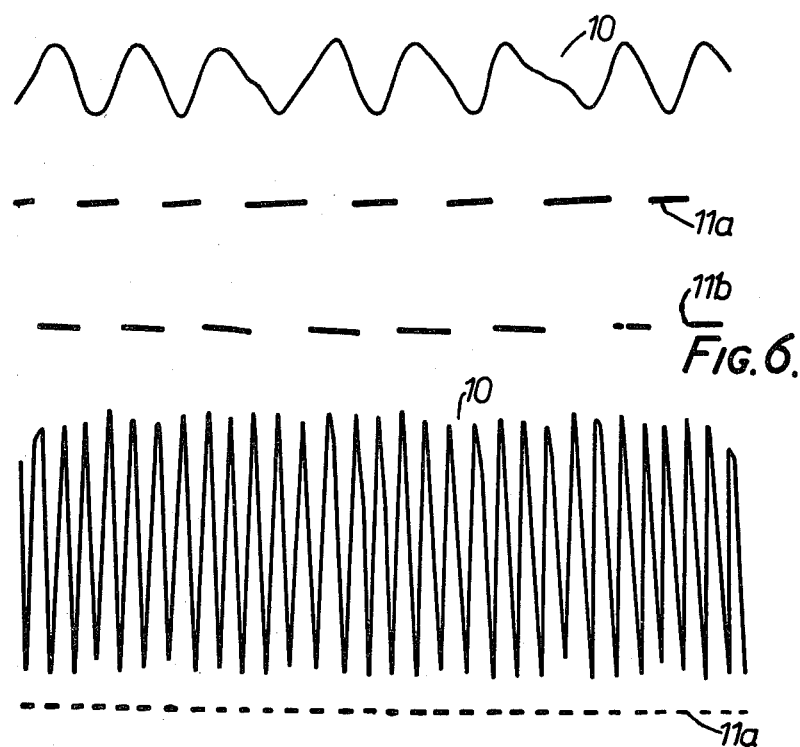
FIG. 6.
FIG. 7.
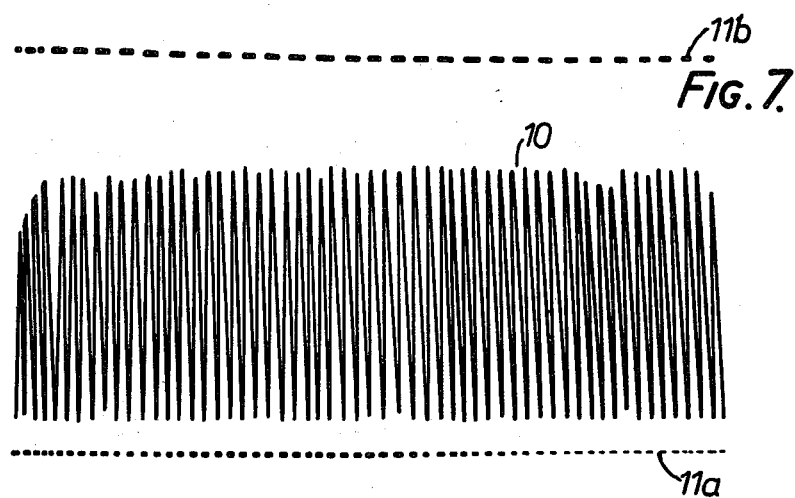
FIG. 8.
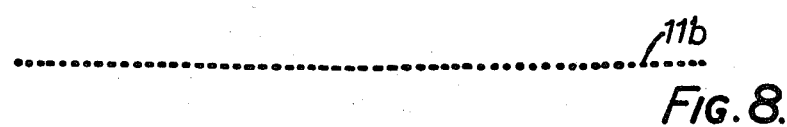

FLUID FLOW MEASURING APPARATUS

FIELD AND BACKGROUND OF THE INVENTION

This invention relates to apparatus for measuring fluid flows, of the kind in which a vortex-shedding bar, preferably symmetrical in cross-section with regard to the direction of fluid flow, is positioned to extend transversely in the flow stream, and the number and frequency of the Karman vortices induced by the bar and shed alternately from opposite sides of the bar is measured. From this measurement it is possible to calculate the main fluid stream velocity, and suitable means for doing this automatically is usually provided.

In the study of fluid flows, it is well known that the ideal flow of a non-viscous fluid past a body of circular cross-section is a laminar flow which is parted symmetrically as it meets the circular-section obstruction, passes around it, and then closes in again behind the obstruction as a symmetrical laminar flow. In practice no real fluid is without viscosity, and in consequence the local velocity of the flow in the immediate vicinity of the surface of the obstruction is lowered by the drag, as compared with the main stream. Thus at low Reynold's numbers, i.e. at low velocities for a given fluid and a certain size of obstruction, the flow pattern is modified to one of symmetrical cross-section but with two zones of elongated reverse rotation occurring in a "stagnation zone" immediately downstream of the obstructing body. As the flow velocity increases these elongated zones become increasingly symmetrical, until instability occurs and separate vortices form alternately on opposite sides of the body. These vortices, known as Karman vortices, stream rearwardly in a stable series alternately from opposite sides of the obstructing body.

If the fluid flow as a whole has a velocity $V_o$, it will be found that the Karman vortices formed move at a velocity $V_v$ which is always smaller than $V_o$. It can be shown (omitting the intermediate mathematics) that the time T between the successive shedding of vortices, the main fluid flow velocity $V_o$, and a linear transverse dimension L of the obstructing body is related to the Reynold's number Re as follows:

$$T \cdot V_o/L = \phi (Re)$$

For a cylinder of diameter D it is found that $T \cdot V_o/D$ is approximately 5 for values of Re between $2 \times 10^2$ and $2 \times 10^5$.

It is usually more convenient to measure the frequency f of vortex shedding, when $f = 1/T$, so that $$f \cdot D/V_o \approx 0.2 \text{ for a cylinder.}$$

From this expression an empirical constant can be derived for a likely range of flow conditions and a fixed cylinder diameter. If this constant is K then $$V_o = f/K$$

Thus by measuring the frequency f of the Karman vortex shedding, it is possible to determine the main fluid stream velocity.

A similar state of affairs exists for bodies of other than cylindrical shape.

Various industrial flow-velocity measuring devices have been developed, based on measurement of the frequency of Karman vortex shedding. For example, the passage of the vortices downstream of the vortex-shedding bar may be detected, either by an ultrasonic sensing beam directed across the width of the flow at a crystal transducer, or by means of fine wires stretched locally across the flow stream, usually known as a hot-wire anemometer, and conducting a constant amount of electrical power, with means for sensing the changes in resistance of the wires with temperature; or in some other way. These means recognise the changes in local velocity in the flow as the rotating vortices pass by, and give an output signal whose shape tends towards the sinusoidal, the peaks (positive and negative) representing the passage of the vortices. As the signal voltages are small, they are amplified and the peaks are chopped, producing a train of square waves which is passed to a digital counter or frequency meter. As indicated above, the overall flow velocity $V_o$ of the flow being investigated, at the vortex-shedding bar, is directly proportional to the frequency f of vortex shedding from the bar, so that the measurement of f enables the flow velocity $V_o$ to be determined.

BRIEF SUMMARY OF THE INVENTION

According to the present invention, a fluid flow meter comprises a flow duct through which a fluid flow whose velocity to be measured can be passed, and a vortex-shedding bar positioned in the duct to extend across its interior transversely to the direction of fluid flow therein, means for sensing the passage of Karman vortices shed from the bar across a flow section close to the bar in the downstream direction, said means producing an alternating output signal, and means for deriving from the output signal a modified output signal of square wave form suitable for operating a digital counter, and at least one additional cross-member positioned in the duct to extend across its interior close to and downstream of the said flow-section where the vortex-sensing means operates, the additional cross-member extending transversely to the vortex-shedding bar and having sufficient width, in the direction transverse to the flow direction, to cause the divergent parting of the fluid flow.

Preferably the additional cross-member is symmetrical in cross section about an axis parallel to the direction of fluid flow past it in the duct.

The upstream surface of the additional cross-member may be of part-cylindrical form, or other smoothly-rounded convex form, and its downstream side may be tapering, giving an aerofoil section, or of part-cylindrical or other rounded form, for example the member may be a cylindrical rod.

However, the additional cross-member may have a flat upstream face which is arranged with its width parallel to the length of the vortex-shedding bar. For example the additional cross-member may be of triangular or rectangular cross-section or T-shaped or U-shaped in cross-section, e.g. of channel section.

The additional cross-member may be straight and may extend lengthwise at right angles to the vortex-shedding bar, or it may be inclined obliquely thereto at an angle in excess of 45°.

There may be more than one of the additional cross-members, for example two additional cross-members in parallel side-by-side relationship, or intersecting one another.

The vortex-shedding bar itself may be cylindrical, or it may be of some other cross-section, not necessarily rounded but symmetrical with respect to the flow direction and having sufficient width to part the flow divergently. For example a square-section bar may be employed, arranged with one diagonal of the cross-section parallel to the flow direction.

The inventor has found that a flow meter embodying the invention may have significantly greater accuracy than known meters of this kind, and this improvement is believed to be due to a reduction in the variations in amplitude of the alternating output signal produced by the vortex-sensing means. This signal is usually fed into a Schmitt trigger circuit to produce the modified square-wave output, but if in a particular cycle the amplitude of the alternating signal is small, its voltage may not reach a value sufficient to operate the Schmitt trigger so that a pulse will be missed and the count rate will be inaccurate. The inventor has found that for some reason not fully understood, the amplitude of the alternating current output signal in existing air flow meters of the kind referred to varies sporadically with time, and this is believed to cause the inaccuracy referred to. The present invention has for its object to provide an empirical means whereby in suitable conditions these sporadic variations in amplitude may be reduced and the accuracy of the count rate may be improved.

DESCRIPTION OF THE DRAWINGS

The invention may be carried into practice in various ways, but one specific embodiment and certain modifications thereof will now be described by way of example only, and with reference to the accompanying drawings, in which:

FIGS. 6, 7 and 8 are diagrams similar to FIGS. 1 and 2 but showing typical alternating and pulsed output signals produced by the meter of FIGS. 3 to 5.

FIGS. 1 and 2 show typical voltage traces produced by one commercially-available air flow meter of the kind referred to, which employs an ultrasonic generator to project an ultrasonic beam across the flow passage behind the vortex-shedding bar at a transducer crystal whose continuous, generally sinusoidal output voltage signal is shown at 10 in each of the two examples. The signal 10 is fed into a Schmitt trigger circuit whose function is, on receipt of a certain small triggering voltage, to generate a very rapid increase in voltage, and a similar very rapid drop when the next triggering voltage level is reached, so that the output of the Schmitt trigger circuit is a series of square waves. These are shown in FIGS. 1 and 2 at 11a and 11b as two rows of horizontal dashes or pulses, representing the top and bottom voltages of the square wave form. These pulses are supplied to a digital counter, being "gated" over a constant time interval so as to indicate the vortex shedding frequency directly.

In FIGS. 1 and 2 the voltage traces are shown in the form in which they were photographically recorded. Due to the extremely short time intervals involved, the "writing speed" during the voltage rise and fall stages of the Schmitt trigger circuit output is too high to be recorded photographically, so that the traces 11a, 11b appear as separate horizontal rows of dashes or pulses.

Figure 1:
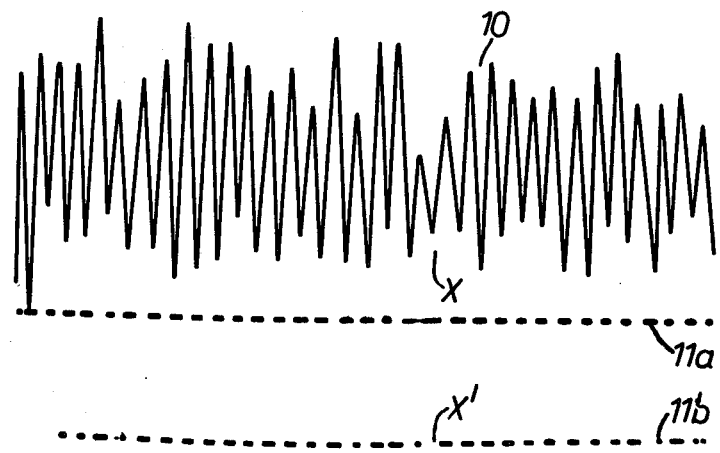
FIGS. 1 and 2 show graphically the alternating and pulsed output signals of a known form of air flow meter.

It will be seen that in places, such as where indicated at X in FIG. 1, the amplitude of the sinusoidal signal is so small that the voltage is insufficient to operate the Schmitt trigger, so that a gap occurs in the corresponding pulse row as indicated at X', and the count rate is inaccurate.

Figure 2:
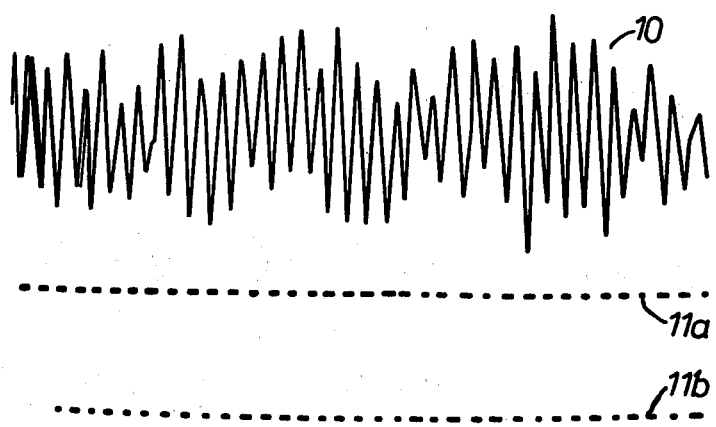
Figure 3:
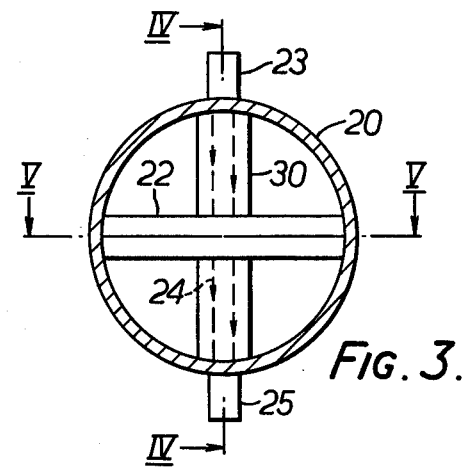
FIG. 3 is a cross-section, on line III—III in FIG. 4, through the flow passage of an air meter embodying the present invention.
Figure 4:
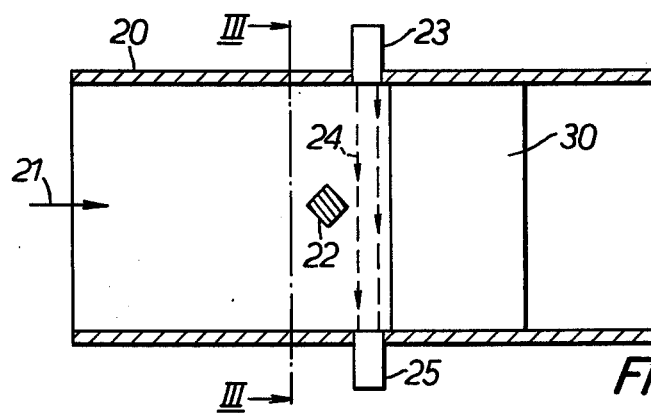
FIGS. 4 and 5 are longitudinal sections on the lines IV—IV and V—V respectively in FIG. 3.
Figure 5:
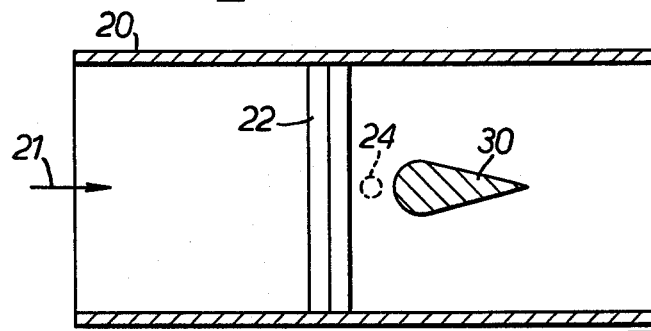

FIGS. 3 to 5 show diagrammatically an embodiment of the invention as applied to the commercially-available air flow meter referred to. The meter comprises a flow passage 20 of cylindrical form, through which the air flow to be measured travels in the direction of the arrow 21. The vortex-shedding bar 22 is of square cross-section, arranged diagonally with respect to the direction of flow, the bar 22 extending diametrically across the flow passage 20. An ultrasonic transmitter 23 directs a beam 24 of ultrasonic sound diametrically across the flow passage 20 just downstream of the vortex-shedding bar 22. The ultrasonic beam 24 is at right angles to the bar 22 and impinges on a crystal transducer 25 mounted on the opposite side of the flow passage 20. The transducer 25 detects the modulation of the sound beam 24 produced by the passage of successive vortices shed alternately from the upper and lower sides of the bar 22, as the vortices pass in succession through the beam 24, and the output signal from the transducer 25, corresponding to the trace 10 in FIG. 1 or FIG. 2, is supplied to a Schmitt trigger circuit for chopping and thence to a digital counter, as described below with reference to FIG. 10.

To improve the uniformity of the amplitude of the generally sinusoidal output signal from the transducer 25, an additional straight cross-member 30 of aerofoil cross-section extends diametrically across the flow passage 10 at right angles to the vortex-shedding bar 22. As shown the member 30 is mounted just downstream of the ultrasonic beam 24 to which it is parallel, with its semi-cylindrical upstream side close to the beam and its tapering downstream side directed in the downstream direction. The cross-member 30 is symmetrical in cross-section about an axis parallel to the direction of flow indicated by the arrow 21, as seen in FIG. 5.

The provision of the additional cross-member 30 with its rounded nose as close as practicable to the ultrasonic beam 24, is found to stabilise the vortex shedding and to permit the vortex-shedding bar 22 to be positioned closer to the line of the sound beam 24, than was possible in the known form of the instrument without loss of sensing of the vortices, and this is found to produce a marked improvement in the regularity of the signal output of the tranducer 25, i.e. in the uniformity of its amplitude.

In one experimental rig set up in accordance with FIGS. 3 to 5, the tube 10 was 102 mm. in diameter, as for the commercial instrument, and a square vortex-shedding rod 22 of 3.2 mm side width was used, positioned and orientated as shown. The aerofoil section 30 has a chord of 45 mm., a semi-cylindrical nose, and a maximum thickness of 12 mm., and was positioned about 7.5 mm behind the trailing edge of the square vortex-shedding bar 22. The axis of the beam 25 was 5 mm. behind the trailing edge of the bar 22.

With this experimental configuration, the output signal of the transducer 25 was found to be regular and excellent in every respect over an air flow range of from 0.02 to 0.30 m³/sec., i.e. a velocity range of 2.45–36.7 m./sec.

FIGS. 6, 7 and 8 show the output signals 10 obtained from the transducer 25 of this experimental rig, respectively at flows of 0.02 m³/sec, 0.15 m³/sec and 0.30 m³/sec. The much improved regularity of the sinusoidal signal amplitude should be noted, leading to regular and clean pulse signals 11a, 11b.

Figure 9:
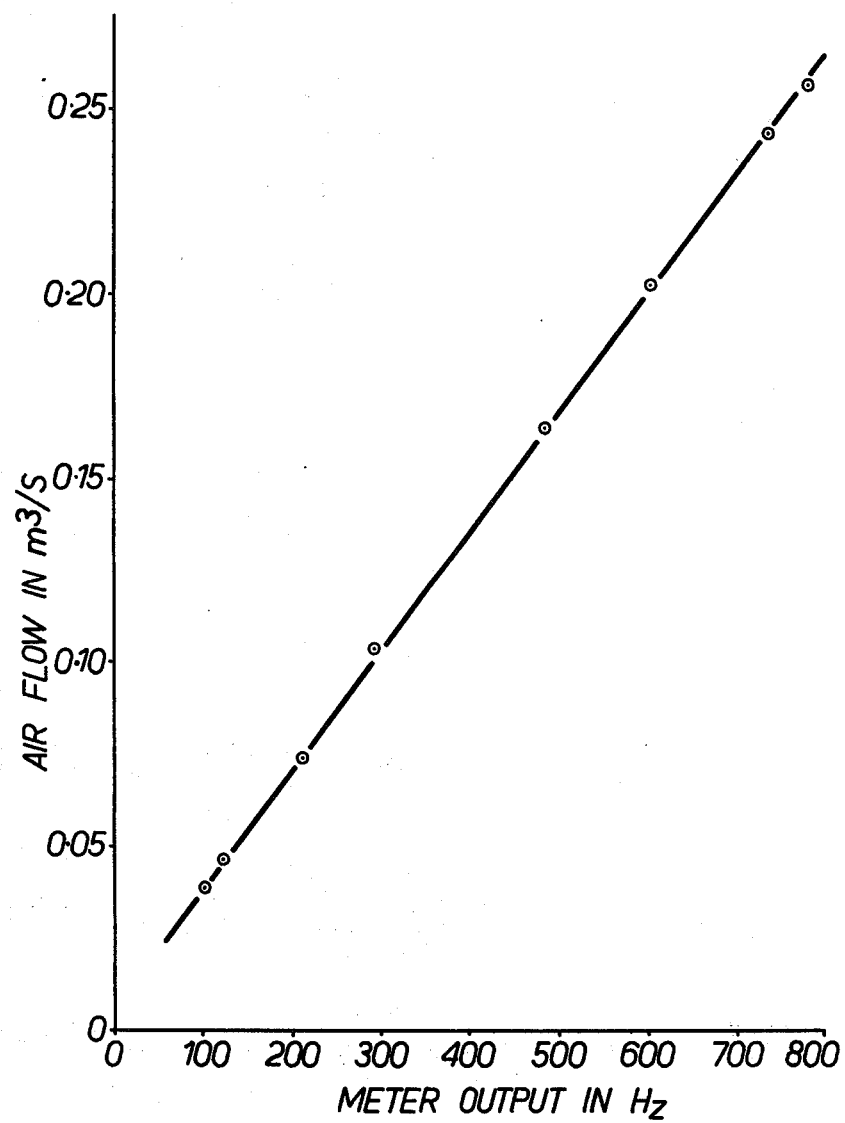
FIG. 9 is a graph showing the relationship between the output frequency of the meter of FIGS. 3 to 5 and the flow rate through the meter.

FIG. 9 shows the relationship obtained between the independently-measured flow rates passed through the experimental rig and the corresponding indicated frequencies of the Karman vortices. The excellent straight-line characteristic should be noted.

Figure 11:
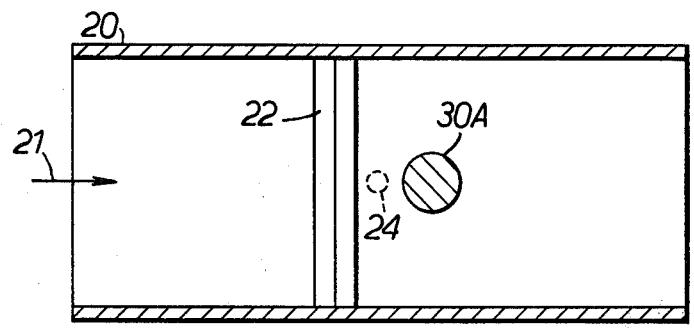
Figure 12:
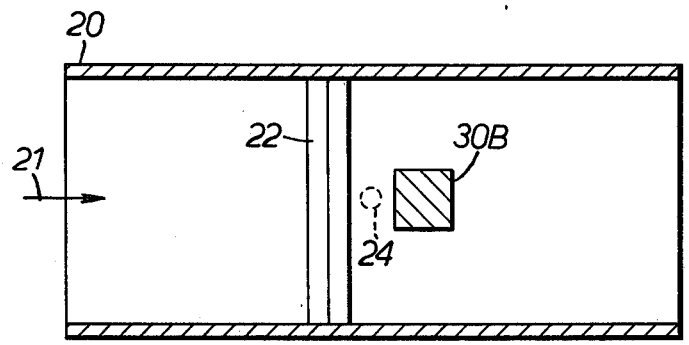

Whilst in the illustrated experimental rig, a downstream cross-member 30 of empirically-selected aerofoil section was employed, it has been found that members 30 of other cross-sections can be employed which also have a beneficial effect on the vortex stabilisation. For example as shown in FIG. 11 a cylindrical rod 30A of suitable size can usefully be employed.

Figure 13:
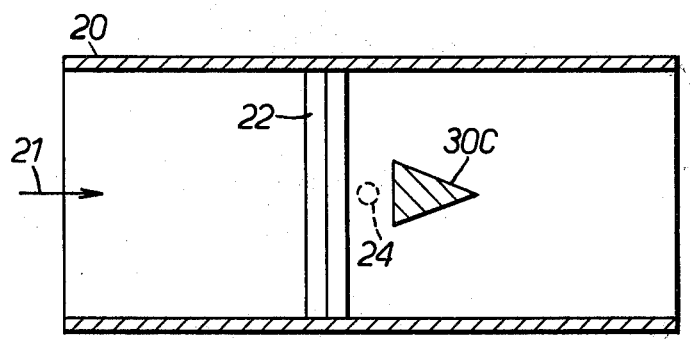
Figure 14:
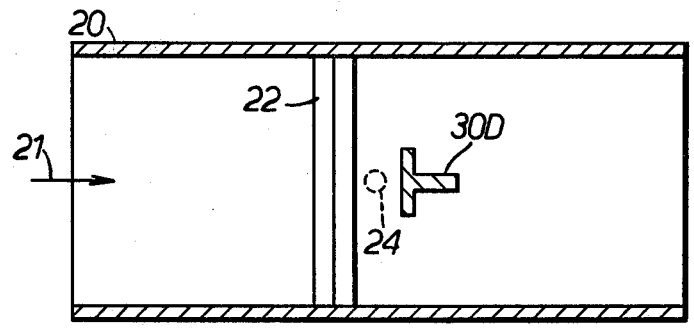
Figure 15:
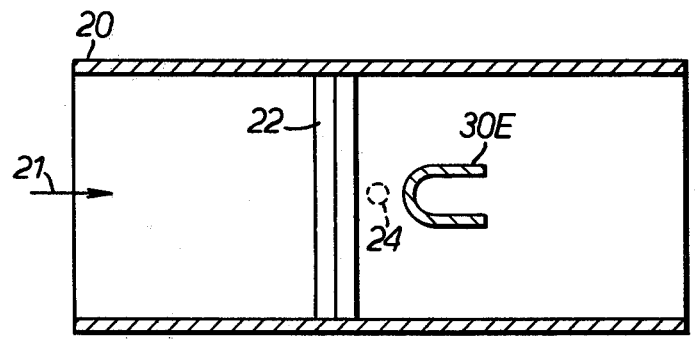
Figure 16:
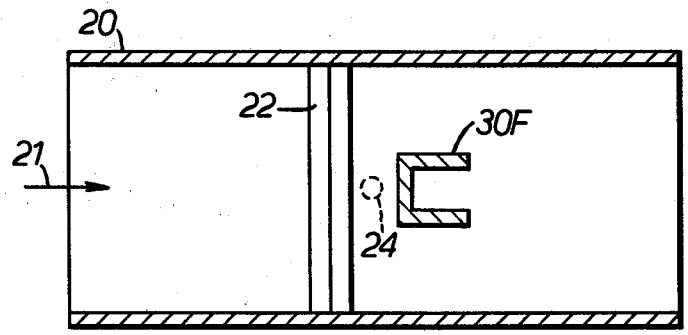

Other shapes of cross-member 30 which have been tested with beneficial results are shown in FIGS. 12 to 16. Thus in FIG. 12 the straight cross-member 30B is of rectangular cross-section with one of its flat sides parallel to the vortex-shedding bar 22. In FIG. 13 the straight member 30C is of triangular section, again with one of its flat sides parallel to the vortex-shedding bar 22. It is probable that a flat strip, arranged with its length transverse to the length of the vortex shedding bar 22 and with its faces parallel thereto, would also stabilise the transducer output signals effectively, but in practice it would be difficult or impossible to prevent such a strip from vibrating in the air flow under service conditions. However, a straight cross-member 30D of T-section, arranged as shown in FIG. 14 with the outer face of its crosspiece 31D facing and parallel to the vortex-shedding bar 22, or a straight cross-member 30E of U-section or 30F of channel section arranged with the base of the U or channel facing the bar 22 and the flanges directed away from the bar 22 in the direction of flow, as shown respectively in FIGS. 15 and 16, could in all probability be employed with beneficial effects on the regularity of vortex shedding.

The cross-member will have to be of sufficient transverse width to cause a divergent parting of the fluid flow, and it will probably have to be of symmetrical cross-section about its transverse axis parallel to the flow direction. Moreover the leading face of the cross-member should preferably be positioned as close to the pencil of transducer signals 24, and downstream thereof, as is possible without physically interrupting the pencil of signals.

However the criteria and the limiting factors regarding possible variations in the shape and position of the cross-member 30, etc. are not fully understood.

In a practical construction of meter, a cross-member 30 of the aerofoil section shown in FIG. 5 will usually be preferred, with a view to minimising the pressure losses across the flow metering section; but this is not essential and in cases where higher pressure losses can be tolerated, cross-members of the other possible shapes referred to could be used.

In each of the embodiments described and illustrated, a single straight cross-member 30, etc. has been used, arranged diametrically with its length perpendicular to the length of the vortex-shedding bar 22. Tests have shown that this perpendicular arrangement is not absolutely essential, and that the cross-member may be oblique to the bar without being perpendicular thereto. However a substantial deterioration in quality is found to occur when the angle of inclination of the cross-member 30, etc. to the vortex-shedding bar reaches ±45°.

While in all the embodiments described and illustrated a single cross-member 30, etc. has been employed, it may also be possible to use two such members, spaced apart in parallel side-by-side relationship or even intersecting one another. In such cases the arrangement of the ultrasonic or other sensing means may need appropriate modification.

The vortex-shedding bar 22 need not be of square section, but other sections of rod could be used, probably necessarily symmetrical about the flow direction.

Other forms of vortex sensing means than the ultrasonic beam could also be employed in conjunction with the additional downstream cross-member referred to, for example of the hot-wire anemometer type previously mentioned.

The invention may also be employed with advantage in connection with flow meters for measuring flows of fluids other than air.

Figure 10:
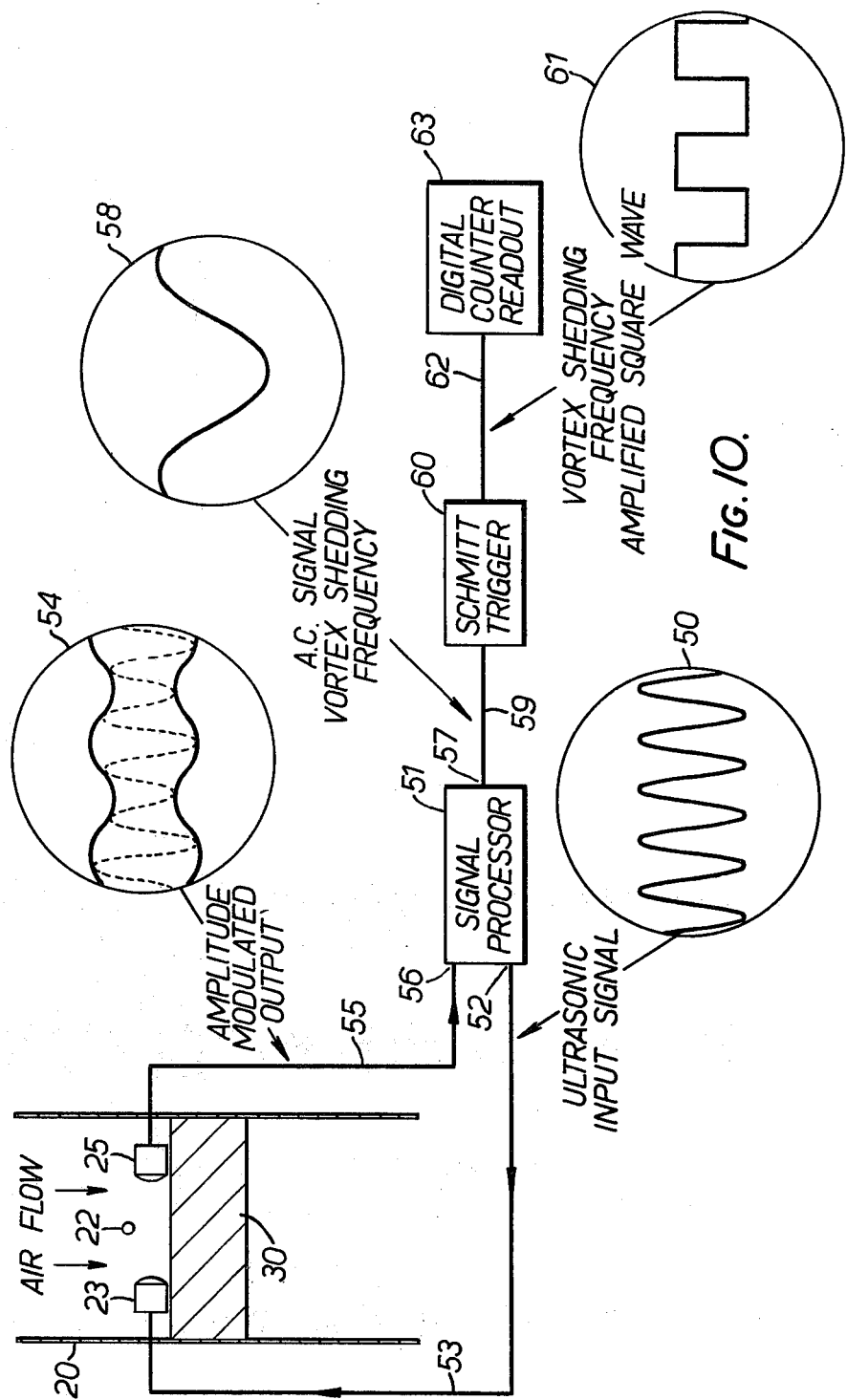
FIG. 10 is a diagram showing the circuit arrangements of the flow meter of FIGS. 3 to 5, and FIGS. 11 to 16 are views similar to FIG. 5 of modified embodiments of the invention with additional cross-members of different cross-sections.

FIG. 10 shows diagrammatically the circuitry of the meter of FIGS. 3 to 5. Thus an input voltage of ultrasonic frequency and having a sinusoidal wave form, as indicated diagrammatically in circle 50, is generated by a signal processor 51 and is supplied from a first output 52 of the processor 51 via a lead 53 to the crystal-type sound-transmitting transducer 23. The sound-receiving transducer 25 delivers a sinusoidal output signal which, as indicated diagrammatically in circle 54, is amplitude-modulated by the passage of the vortices shed by the bar 22 across the ultrasonic beam 24, this output signal being supplied by a lead 55 to an input 56 of the signal processor 51. The signal processor 51 removes the original carrier-frequency component of the modulated wave form, and delivers from its second output 57 an output signal which as indicated in circle 58 is of sinusoidal form having the low modulation frequency corresponding to the frequency f of shedding of the vortices, this being a function of the air flow velocity $V_o$ in the passage 20 as previously explained. This signal of low frequency f is supplied via a lead 59 to a Schmitt trigger circuit 60 which transforms it into a series of square waves as indicated diagrammatically in circle 61, which are supplied via a lead 62 to a digital counter 63 having a direct read-out, the counter 63 being suitably gated for fixed time intervals to provide a read-out which is a direct measure of the air flow velocity $V_o$ and hence, for a given diameter of the meter passage 20, of the volumetric flow velocity.

What we claim as our invention and desire to secure by Letters Patent is:

1. A fluid flow meter which comprises a flow duct through whose interior a fluid flow whose velocity to be measured can be passed, and a vortex-shedding bar positioned in the duct to extend across its interior transversely to the direction of fluid flow therein, means for sensing the passage of Karman vortices shed from the bar across a flow section close to the bar in the downstream direction said means producing an alternating output signal, and means for deriving from the output signal a modified output signal of square wave form suitable for operating a digital counter, wherein the improvement comprises at least one additional cross-member positioned in the duct to extend across its interior close to and down-stream of the said flow-section where the vortex-sensing means operates, the additional cross-member extending transversely to the vortex-shedding bar and having sufficient width, in the direction transverse to the flow direction, to cause the divergent parting of the fluid flow.

2. A fluid flow meter as claimed in claim 1 in which the additional cross-member is symmetrical in cross-section about an axis parallel to the direction of fluid flow past it in the duct.

3. A fluid flow meter as claimed in claim 2, in which the upstream surface of the additional cross-member is of part-cylindrical form.

4. A fluid flow meter as claimed in claim 3 in which the additional cross-member is of aerofoil cross-section tapering in section on its downstream side.

5. A fluid flow meter as claimed in claim 3 in which the additional cross-member is of cylindrical shape.

6. A fluid flow meter as claimed in claim 2 in which the upstream face of the additional cross-member is flat, with its width parallel to the length of the vortex-shedding bar.

7. A fluid flow meter as claimed in claim 6 in which the additional cross-member is of rectangular or triangular cross-section.

8. A fluid flow meter as claimed in claim 6 in which the additional cross-member is of T-shaped cross-section, arranged with the cross-bar of the T upstream of the leg of the T.

9. A fluid flow meter as claimed in claim 6 in which the additional cross-member is of channel section, arranged with the base of the channel upstream of the sides of the channel.

10. A fluid flow meter as claimed in claim 1, in which the additional cross-member is straight and extends lengthwise at right angles to the vortex-shedding bar.

11. A fluid flow meter as claimed in claim 1, in which the additional cross-member is straight and is inclined obliquely to the vortex-shedding bar at an angle in excess of 45°.

12. A fluid flow meter as claimed in claim 1 having at least two of the said additional cross-members arranged in parallel side-by-side relationship.

13. A fluid flow meter as claimed in claim 1 having at least two of the said additional cross-members which intersect one another.

14. A fluid flow meter as claimed in claim 1, in which the means for sensing the passage of Karman vortices comprises an ultrasonic generator arranged to project a beam of ultrasonic sound waves across the duct immediately downstream of the vortex-shedding bar and transversely thereto, and a transducer arranged to receive the ultrasonic beam.

* * * * *